United States Patent
Alexander et al.

(10) Patent No.: US 8,857,174 B2
(45) Date of Patent: Oct. 14, 2014

(54) VEHICLE ENERGY HARVESTING DEVICE HAVING DISCRETE SECTIONS OF SHAPE MEMORY ALLOY

(75) Inventors: Paul W. Alexander, Ypsilanti, MI (US); Alan L. Browne, Grosse Pointe, MI (US); Patrick B. Usoro, Troy, MI (US); Xiujie Gao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 619 days.

(21) Appl. No.: 12/947,870

(22) Filed: Nov. 17, 2010

(65) Prior Publication Data

US 2011/0120113 A1    May 26, 2011

Related U.S. Application Data (60) Provisional application No. 61/263,293, filed on Nov. 20, 2009.

(51) Int. Cl.
    *F01B 29/10*    (2006.01)
    *F02G 1/04*     (2006.01)
    *F02G 5/04*     (2006.01)

(52) U.S. Cl.
    CPC . *F02G 5/04* (2013.01); *Y02T 10/166* (2013.01)
    USPC .......................................................... 60/527

(58) Field of Classification Search
    USPC .................................................. 60/527, 529
    See application file for complete search history.

(56) References Cited

U.S. PATENT DOCUMENTS

| | | | |
|---|---|---|---|
| 534,871 A * | 2/1895 | French | 60/527 |
| 4,055,955 A * | 11/1977 | Johnson | 60/527 |
| 4,150,544 A | 4/1979 | Pachter | |
| 4,275,561 A * | 6/1981 | Wang | 60/527 |
| 4,683,721 A * | 8/1987 | Shin et al. | 60/527 |
| 5,086,618 A * | 2/1992 | Tanaka | 60/527 |
| 6,313,562 B1 * | 11/2001 | Barnes et al. | 310/306 |
| 2006/0037315 A1 * | 2/2006 | Zanella et al. | 60/527 |
| 2006/0266031 A1 * | 11/2006 | Kosaka et al. | 60/527 |
| 2007/0289301 A1 * | 12/2007 | Taya et al. | 60/527 |
| 2008/0034750 A1 * | 2/2008 | Gao et al. | 60/527 |

FOREIGN PATENT DOCUMENTS

CN    2515437 Y    10/2002

OTHER PUBLICATIONS

Kauffman, George B. Memory Metal, Oct. 1993. American Chemical Society. ChemMatters, p. 4.*

* cited by examiner

*Primary Examiner* — Thomas Denion
*Assistant Examiner* — Brian Inacay
(74) *Attorney, Agent, or Firm* — Quinn Law Group, PLLC (57) ABSTRACT

An energy harvesting system comprises a first region having a first temperature and a second region having a second temperature. A heat engine is configured for converting thermal energy to mechanical energy. The heat engine includes a plurality of discrete elements of a shape memory alloy each having a crystallographic phase changeable between austenite and martensite in response to a temperature difference between the first region and the second region. At least one member of the heat engine is driven to rotate about a first axis by the phase change of the plurality of discrete elements.

9 Claims, 6 Drawing Sheets

VEHICLE ENERGY HARVESTING DEVICE HAVING DISCRETE SECTIONS OF SHAPE MEMORY ALLOY

CROSS REFERENCE TO RELATED APPLICATIONS

This application claims the benefit of U.S. Provisional Application Ser. No. 61/263,293 filed Nov. 20, 2009, the entire contents of which are hereby incorporated by reference.

TECHNICAL FIELD

The present invention generally relates to a vehicle, and more specifically, to an energy source for the vehicle and vehicle accessories.

BACKGROUND OF THE INVENTION

Vehicles are traditionally powered by engines that drive the vehicle and batteries that provide power for starting the engine and for vehicle accessories. Advancements in technology and a desire for driver conveniences have increased the number of vehicle accessories, as well as increased the load, i.e., power demand, on the engine and/or the battery required to power the vehicle accessories. In addition, the vehicle power sources and components produce a large quantity of waste heat, i.e., waste thermal energy that is typically dissipated into the atmosphere and lost.

Accordingly, arrangements for extending driving range and increasing the fuel efficiency of the vehicle are desirable. Therefore, systems that increase the fuel efficiency of the vehicle and reduce the power load on the vehicle's traditional power sources, i.e., the engine and/or the battery, are desirable, and significant vehicle fuel economy gains may be realized if even just a few percent of the vehicle's waste heat is converted into usable mechanical and/or electrical energy.

SUMMARY

An energy harvesting system comprises a first region having a first temperature and a second region having a second temperature that is different from the first temperature. A conduit is located at least partially within the first region. A heat engine is configured for converting thermal energy to mechanical energy. The heat engine includes a plurality of discrete elements of a shape memory alloy each having a crystallographic phase changeable between austenite and martensite in response to a temperature difference between the first region and the second region. At least one member of the heat engine is driven to rotate about a first axis by the crystallographic phase change of the plurality of discrete elements. A component is driven by the rotational output of the at least one member for the heat engine.

A method of harvesting energy comprises exposing a plurality of discrete elements of a shape memory alloy to heat exchange contact with a first region having a first temperature and a second region having a second temperature that is different from the first temperature. The shape memory alloy has a crystallographic phase changeable between austenite and martensite in response to the temperature difference between the first region and the second region. The plurality of discrete elements of the shape memory alloy are expanded and contracted in response to a combination of induced stress and the shape memory alloy and modulus changes accompanying the phase change in shape memory alloy due to the temperature difference between the first region and the second region. A linear displacement of at least a portion of the plurality of discrete elements of the shape memory alloy occurs in response to the temperature difference between the first region and the second region. A member of the heat engine is rotated as a result of the linear displacement of the plurality of discrete elements and a component is driven by the rotation of the member of the heat engine.

An energy harvesting system comprises a first region having a first temperature and a second region having a second temperature that is different from the first temperature. A conduit is located at least partially within the first region. A heat engine is configured for converting thermal energy to mechanical energy. The heat engine includes a plurality of discrete elements of a shape memory alloy each having a crystallographic phase changeable between austenite and martensite in response to a temperature difference between the first region and the second region. A first wheel defines a first axis. A second wheel is located proximate to the first wheel and is centered around the first axis. The plurality of discrete elements each extend from one location on the circumference of the first wheel to a second location on the circumference of the second wheel. The first wheel and the second wheel are driven to rotate about the first axis by the crystallographic phase change of the plurality of discrete elements. A component of the vehicle is driven by the rotation of the first wheel or the second wheel.

The above features and advantages, and other features and advantages of the present invention will be readily apparent from the following detailed description of the preferred embodiments and best modes for carrying out the present invention when taken in connection with the accompanying drawings and appended claims.

DESCRIPTION OF THE PREFERRED EMBODIMENTS

Figure 1:
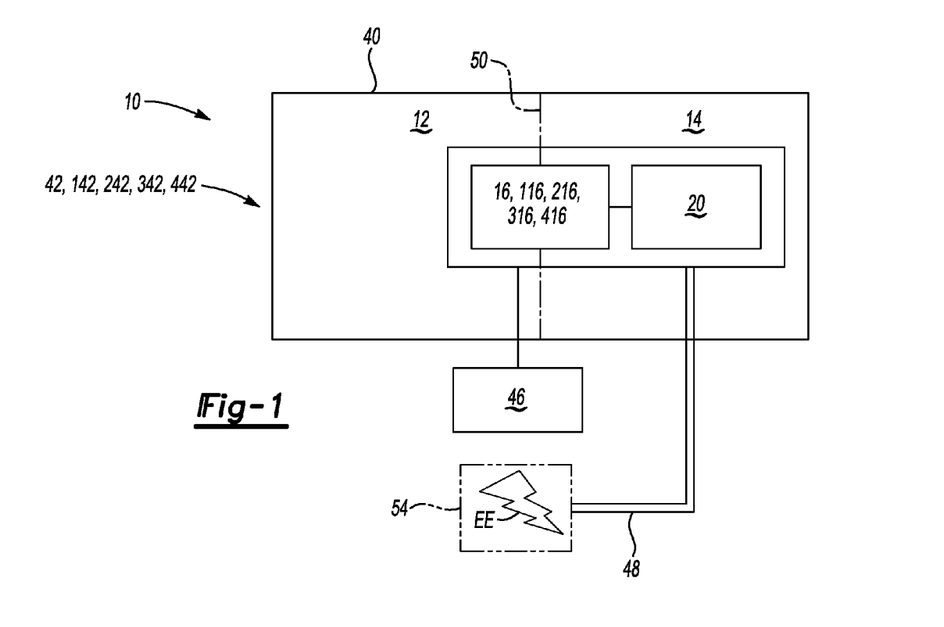
FIG. 1 is a schematic diagram of a vehicle having an energy harvesting system.

Referring to the Figures, wherein like reference numerals refer to like elements, a vehicle is shown generally at 10 in FIG. 1. The vehicle 10 includes an energy harvesting system 42, 142, 242, 342, 442. The energy harvesting system 42, 142, 242, 342, 442 utilizes the temperature difference between a first region 12 and a second region 14 to generate mechanical or electrical energy, and therefore may be useful for automotive applications. However, it is to be appreciated that the energy harvesting system 42, 142, 242, 342, 442 may also be useful for non-automotive applications. The energy harvesting system 42, 142, 242, 342, 442 includes a heat engine 16, 116, 216, 316, 416. The heat engine 16, 116, 216, 316, 416 is configured for converting thermal energy, e.g., heat, to mechanical or heat to mechanical and then to electrical energy, as set forth in more detail below.

The vehicle 10 defines a compartment 40 which may house power and drive sources for the vehicle 10, such as an engine and transmission (not shown). The compartment 40 may or may not be enclosed from the surrounding environment, and may include regions and components exterior to the vehicle 10 such as an exhaust pipe and catalytic converter, shock absorbers, brakes, and any other region where energy is dissipated as heat proximate to or in the vehicle 10 such as in a passenger compartment, engine compartment, or a battery compartment (such as in an electric vehicle).

The energy harvesting system 42, 142, 242, 342, 442 is at least partially located within the compartment 40. The power and drive sources (not shown) for the vehicle 10 typically generate heat. Therefore, the compartment 40 includes the first region 12 and the second region 14 having a temperature difference therebetween. The first region 12 and the second region 14 may be spaced apart from one another to provide a sufficient heat exchange barrier 50 between the first region 12 and the second region 14. The fluid within the energy harvesting system 42, 142, 242, 342, 442 forming the first region 12 and the second region 14 may be selected from a group of gases, liquids, and combinations thereof. The fluid within the first region 12 may be a different fluid than the fluid within the second region 14. In the embodiment discussed above where the compartment 40 is an engine compartment, fluid within the first region 12 and the second region 14 is air within the compartment 40.

Several examples within a vehicle 10 where the energy harvesting system 42, 142, 242, 342, 442 may take advantage of temperature differentials are proximate to or incorporated with an exhaust system, including proximity to a catalytic converter, next to a battery for the vehicle or within a battery compartment for electric vehicles, proximate to a transmission, brakes, or components of the vehicle suspension, in particular a shock absorber, or proximate to or incorporated within a heat exchanger, such as a radiator. The above examples list areas of the vehicle 10 which may act as one of the first region 12 or the second region 14. The energy harvesting system 42, 142, 242, 342, 442 may be positioned such that the other of the first region 12 or the second region 14 is separated by a sufficient heat exchange barrier 50 to provide the required temperature differential. The above list only provides examples of where the energy harvesting system 42, 142, 242, 342, 442 may be located and is not intended to be all inclusive of arrangements for the energy harvesting system 42, 142, 242, 342, 442. One skilled in the art would be able to determine areas having an associated temperature differential and an appropriate position for the energy harvesting system 42, 142, 242, 342, 442 to take advantage of the temperature differences.

The energy harvesting system 42, 142, 242, 342, 442 also includes a driven component 20. The component 20 may be a simple mechanical device, selected from a group including a fan, a belt, a clutch drive, a blower, a pump, a compressor and combinations thereof. The component 20 is driven by the heat engine 16, 116, 216, 316, 416. The component 20 may be part of an existing system within the vehicle 10 such as a heating or cooling system. The mechanical energy may drive the component 20 or may assist other systems of the vehicle 10 in driving the component 20. Driving the component 20 with power provided by the heat engine 16, 116, 216, 316, 416 may also allow an associated existing system within the vehicle 10 to be decreased in size/capacity providing weight savings in addition to the energy savings.

Alternately, the component 20 may be a generator. The component/generator 20 is configured for converting mechanical energy from the heat engine 16, 116, 216, 316, 416 to electricity (represented generally by symbol EE in FIG. 1). The component/generator 20 may be any suitable device for converting mechanical energy to electricity EE. For example, the component/generator 20 may be an electrical generator that converts mechanical energy to electricity EE using electromagnetic induction, and may include a rotor (not shown) that rotates with respect to a stator (not shown). The electrical energy EE from the component/generator 20 may then be used to assist in powering the main or accessory drive systems within the vehicle 10.

As explained above, the energy harvesting system 42, 142, 242, 342, 442 is configured for generating mechanical or electric energy and includes structure defining the first region 12 having a first temperature and structure defining the second region 14 having a second temperature that is different from the first temperature.

In one variation, the energy harvesting system 42, 142, 242, 342, 442 also includes an electronic control unit 46. The electronic control unit 46 is in operable communication with the vehicle 10. The electronic control unit 46 may be, for example, a computer that electronically communicates with one or more controls and/or sensors of the energy harvesting system 42, 142, 242, 342, 442. For example, the electronic control unit 46 may communicate with and/or control one or more of a temperature sensor within the first region 12, a temperature sensor within the second region 14, a speed regulator of the component 20, fluid flow sensors, and meters configured for monitoring electricity generation. The electronic control unit 46 may control the harvesting of energy under predetermined conditions of the vehicle 10. For example, after the vehicle 10 has operated for a sufficient period of time to ensure that a temperature differential between the first region 12 and the second region 14 is at an optimal difference the electronic control unit 46 may start the energy harvesting system 42, 142, 242, 342, 442. An electronic control unit 46 may also provide the option to manually override the heat engine 16, 116, 216, 316, 416 to allow the energy harvesting system 42, 142, 242, 342, 442 to be turned off. A clutch (not shown) controlled by the electronic control unit 46 may be used to disengage the heat engine 16, 116, 216, 316, 416 from the component 20.

As also shown in FIG. 1, the energy harvesting system 42, 142, 242, 342, 442 includes a transfer medium 48 configured for conveying electricity EE from the energy harvesting system 42, 142, 242, 342, 442. In particular, the transfer medium 48 may convey electricity EE from the component/generator 20. The transfer medium 48 may be, for example, a power line or an electrically-conductive cable. The transfer medium 48 may convey electricity EE from the component/generator 20 to a storage device 54, e.g., a battery for the vehicle. The storage device 54 may also be located proximate to but separate from the vehicle 10. Such a storage device 54 may allow the energy harvesting system 42, 142, 242, 342, 442 to be utilized with a parked vehicle such as 10. For example, the energy harvesting system 42, 142, 242, 342, 442 may take advantage of a temperature differential created by sun load on a hood for the compartment 40 and store the electrical energy EE generated in the storage device 54.

Whether the energy from the energy harvesting system 42, 142, 242, 342, 442 is used to drive a component 20 directly or stored for later usage the energy harvesting system 42, 142, 242, 342, 442 provides additional energy to the vehicle 10 and reduces the load on the main energy sources for driving the vehicle 10. Thus, the energy harvesting system 42, 142, 242, 342, 442 increases the fuel economy and range for the vehicle 10. As described above, the energy harvesting system 42, 142, 242, 342, 442 may operate autonomously requiring no input from the vehicle 10.

It is to be appreciated that for any of the aforementioned examples, the vehicle 10 and/or the energy harvesting system 42, 142, 242, 342, 442 may include a plurality of heat engines 16, 116, 216, 316, 416 and/or a plurality of components 20. That is, one vehicle 10 may include more than one heat engine 16, 116, 216, 316, 416 and/or component 20. For example, one heat engine 16, 116, 216, 316, 416 may drive more than one component 20. Likewise, vehicle 10 may include more than one energy harvesting system 42, 142, 242, 342, 442, each including at least one heat engine 16, 116, 216, 316, 416 and component 20. Multiple heat engines 16, 116, 216, 316, 416 may take advantage of multiple regions of temperature differentials throughout the vehicle 10.

Figure 2:
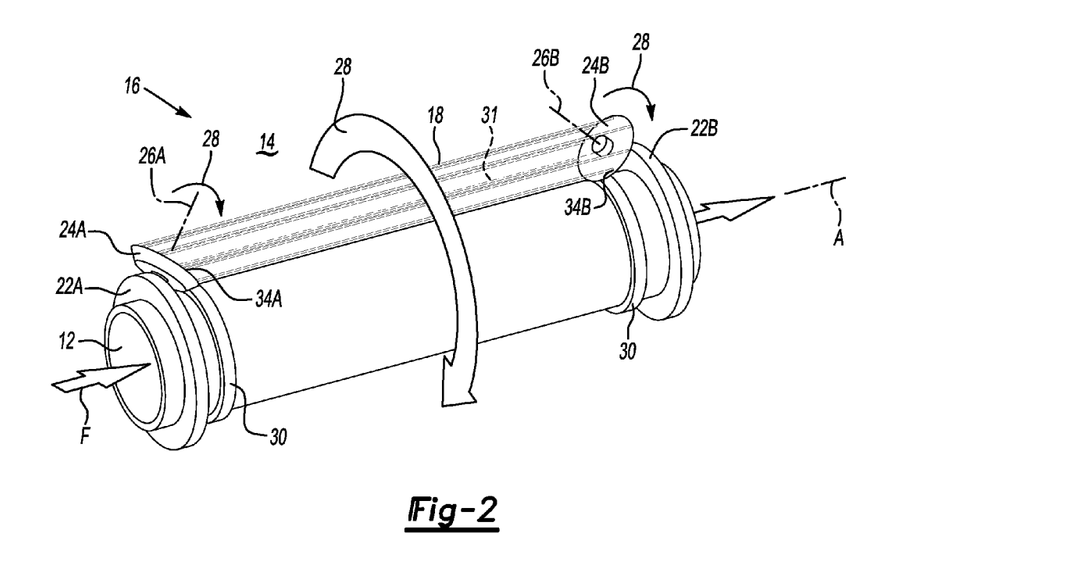
FIG. 2 is a schematic perspective view of a first embodiment of the energy harvesting system of FIG. 1.

Referring now to FIGS. 1 and 2, the heat engine 16 is configured for converting thermal energy, e.g., heat, to mechanical energy or heat to mechanical energy and then to electrical energy, as set forth in more detail below. The heat engine 16 includes a shape memory alloy 18 (FIG. 2) having a crystallographic phase changeable between austenite and martensite at a specific temperature to which the shape memory alloy 18 is exposed in one of the first region 12 and the second region 14. In response to the temperature difference of the first region 12 and the second region 14 (FIG. 1) the shape memory alloy undergoes the crystallographic phase change while passing between the first region 12 and the second region 14. The below description is in reference to FIG. 2. However, the shape memory alloy 18 of all the embodiments operates in a similar manner.

As used herein, the terminology "shape memory alloy" refers to alloys which exhibit a shape memory effect. That is, the shape memory alloy 18 may undergo a solid state phase change via molecular rearrangement to shift between a martensite phase, i.e., "martensite", and an austenite phase, i.e., "austenite". Stated differently, the shape memory alloy 18 may undergo a displacive transformation rather than a diffusional transformation to shift between martensite and austenite. In general, the martensite phase refers to the comparatively lower-temperature phase and is often more deformable than the comparatively higher-temperature austenite phase. The temperature at which the shape memory alloy 18 begins to change from the austenite phase to the martensite phase is known as the martensite start temperature, $M_s$. The temperature at which the shape memory alloy 18 completes the change from the austenite phase to the martensite phase is known as the martensite finish temperature, $M_f$. Similarly, as the shape memory alloy 18 is heated, the temperature at which the shape memory alloy 18 begins to change from the martensite phase to the austenite phase is known as the austenite start temperature, $A_s$. And, the temperature at which the shape memory alloy 18 completes the change from the martensite phase to the austenite phase is known as the austenite finish temperature, $A_f$.

Therefore, the shape memory alloy 18 may be characterized by a cold state, i.e., when a temperature of the shape memory alloy 18 is below the martensite finish temperature $M_f$ of the shape memory alloy 18. Likewise, the shape memory alloy 18 may also be characterized by a hot state, i.e., when the temperature of the shape memory alloy 18 is above the austenite finish temperature $A_f$ of the shape memory alloy 18.

In operation, i.e., when exposed to the temperature difference of first region 12 and the second region 14, the shape memory alloy 18, if pre-strained or subjected to tensile stress, can change dimension upon changing crystallographic phase to thereby convert thermal energy to mechanical energy. That is, the shape memory alloy 18 may change crystallographic phase from martensite to austenite and thereby dimensionally contract if pseudoplastically pre-strained so as to convert thermal energy to mechanical energy. Conversely, the shape memory alloy 18 may change crystallographic phase from austenite to martensite and if under stress thereby dimensionally expand so as to convert thermal energy to mechanical energy.

Pseudoplastically pre-strained refers to stretching the shape memory alloy 18 while in the martensite phase so that the strain exhibited by the shape memory alloy 18 under that loading condition is not fully recovered when unloaded, where purely elastic strain would be fully recovered. In the case of shape memory alloy 18, it is possible to load the material such that the elastic strain limit is surpassed and deformation takes place in the martensitic crystal structure of the material prior to exceeding the true plastic strain limit of the material. Strain of this type, between those two limits, is pseudoplastic strain, called such because upon unloading it appears to have plastically deformed, but when heated to the point that the shape memory alloy 18 transforms to its austenite phase, that strain can be recovered, returning the shape memory alloy 18 to the original length observed prior to any load applied. Shape memory alloy 18 is typically stretched before installation into the heat engine 18, such that the nominal length of the shape memory alloy 18 includes that recoverable pseudoplastic strain, which provides the motion used for actuating/driving the heat engine 16. Without pre-stretching the shape memory alloy 18, little deformation would be seen during phase transformation.

The shape memory alloy 18 may have any suitable composition. In particular, the shape memory alloy 18 may include an element selected from the group including cobalt, nickel, titanium, indium, manganese, iron, palladium, zinc, copper, silver, gold, cadmium, tin, silicon, platinum, gallium, and combinations thereof. For example, suitable shape memory alloys 18 may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations thereof. The shape memory alloy 18 can be binary, ternary, or any higher order so long as the shape memory alloy 18 exhibits a shape memory effect, e.g., a change in shape orientation, damping capacity, and the like. A skilled artisan may select the shape memory alloy 18 according to desired operating temperatures within the compartment 40 (FIG. 1), as set forth in more detail below. In one specific example, the shape memory alloy 18 may include nickel and titanium.

Further, the shape memory alloy 18 may have any suitable form, i.e., shape. For example, the shape memory alloy 18 may have a form selected from the group including bias members (such as springs), tapes, wires, bands, and combinations thereof. Referring to FIG. 2, in one variation, the shape memory alloy 18 may be formed as a discrete length of wire.

The heat engine 16, and more specifically, the shape memory alloy 18 (FIG. 2) of the heat engine 16, is disposed in thermal contact or heat exchange relation with each of the first region 12 and the second region 14. Therefore, the shape memory alloy 18 may change crystallographic phase between austenite and martensite upon thermal contact or heat exchange relation with one of the first region 12 and the second region 14. For example, upon contact with the first region 12, the shape memory alloy 18 may change from martensite to austenite. Likewise, upon contact with the second region 14, the shape memory alloy 18 may change from austenite to martensite.

Further, the shape memory alloy 18 may change both modulus and dimension upon changing crystallographic phase to thereby convert thermal energy to mechanical energy. More specifically, the shape memory alloy 18, if pseudoplastically pre-strained may dimensionally contract upon changing crystallographic phase from martensite to austenite and may dimensionally expand, if under tensile stress, upon changing crystallographic phase from austenite to martensite to thereby convert thermal energy to mechanical energy. Therefore, for any condition wherein the temperature difference exists between the first temperature of the first region 12 and the second temperature of the second region 14, i.e., wherein the first region 12 and the second region 14 are not in thermal equilibrium, the shape memory alloy 18 may dimensionally expand and contract upon changing crystallographic phase between martensite and austenite. And, the change in crystallographic phase of the shape memory alloy 18 may cause the shape memory alloy to drive a linear actuator (shown in FIG. 2) and, thus, drive the component 20.

Figure 3:
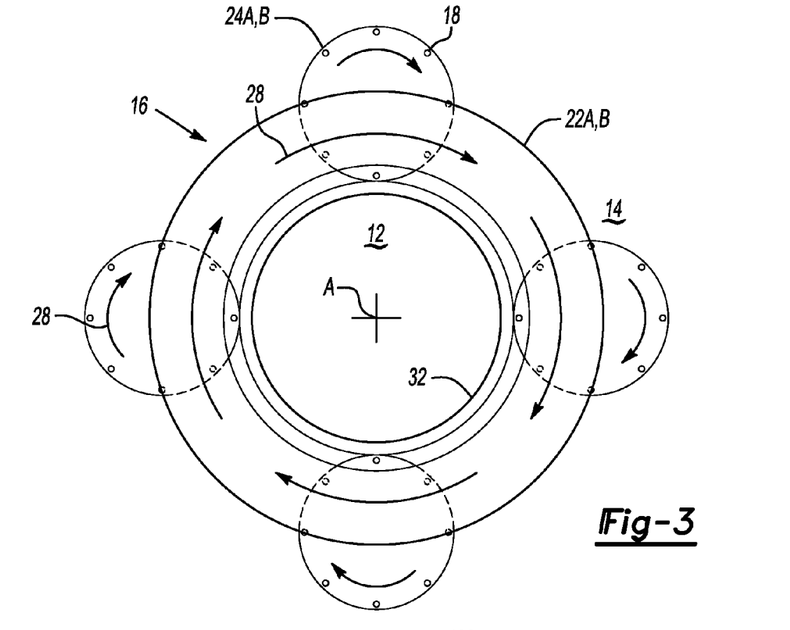
FIG. 3 is a partial schematic end view of the first embodiment of the energy harvesting system of FIGS. 1 and 2.

Referring to FIGS. 2 and 3, a first embodiment of the heat engine 16 is described in greater detail. The heat engine 16 may include a first carrier 22A and a second carrier 22B. A first plurality of wheels 24A are rotationally supported by the first carrier 22A and a second plurality of wheels 24B are rotationally supported by the second carrier 22B. The wheels 24A, B are generally concentrically arranged about a conduit 32 and are driven to rotate by a plurality of discrete wires formed of shape memory alloy 18. Each discrete wire of the shape memory alloy 18 has a first attachment location 34A on the first wheel 24A and a second attachment location 34B on the second wheel 24B.

The conduit 32 generally surrounds or is located within the first region 12. Fluid may flow through the conduit 32, as indicated by arrow F. Although the first region 12 may be mostly or entirely located within the conduit 32, the shape memory alloy 18 is in thermal contact or heat exchange relationship with the first region 12. The fluid within the energy harvesting system 42 forming the first region 12 and the second region 14 may be selected from a group of gases, liquids, and combinations thereof. The fluid may be for example, the first region 12 may be an exhaust pipe for the vehicle 10. The heat engine 16 is arranged about the exhaust pipe to take advantage of the temperature differential between the interior of the exhaust pipe and the exterior of the exhaust pipe.

As the shape memory alloy 18 is exposed to thermal contact or heat exchange relation with the first region 12 and the second region 14, the shape memory alloy 18 dimensionally expands and contracts. Additionally, the modulus of the shape memory alloy 18 changes as the shape memory alloy 18 is exposed to thermal contact or heat exchange relation with the first region 12 and the second region 14. In response to the dimensionally expanding and contracting shape memory alloy 18 and the accompanying changes in modulus, the carriers 22A, 22B are driven to rotate in a first rotational direction, indicated by arrow 28, about a first axis A.

The temperature differential between the first region 12 and the second region 14 causes the shape memory alloy 18 to sufficiently dimensionally contract or expand in order to rotate the wheels 24A, 24B about a respective wheel axis 26A, B. As shown, the wheel axes 26A and 26B extend from the carriers 22A, 22B such that the wheels 24A, 24B have an angular relationship with the conduit 32. In particular, the wheels 24A, 24B have a non-perpendicular angular relationship with the conduit 32. As a result, the discrete wire of the shape memory alloy 18 that is radially closer to the first axis A will have a shorter length between attachment points 34A and 34B than the shape memory alloy 18 that is radially further from the first axis A.

The sufficient dimensional contraction or expansion the shape memory alloy 18 causes wheels 24 to rotate. That is, sufficient dimensional contraction of the discrete element of the shape memory alloy 18 forces the wheels 24A, and 24B to rotate such that there is a shorter distance between the respective first attachment location 34A and second attachment location 34B to accommodate the contracted discrete element of the shape memory alloy 18. Conversely, sufficient dimensional expansion of the discrete element of the shape memory alloy 18 allows the wheels 24A and 24B to rotate such that there is a longer distance between first attachment location 34A and second attachment location 34B. Repeated heating and cooling of the discrete element of the shape memory alloy 18 rotates the wheels 24A, 24B about their axes 26A, 26B. In response to the rotation driven by the shape memory alloy 18, the wheels 24A, 24B and the carriers 22A, 22B "walk" around the conduit 32.

A solid link 31 may extend from each of the first wheels 24A to the second wheels 24B. The solid link 31 may be connected to the wheels 24A, 24B at the center of each wheel 24A, 24B such that the solid link does not have to accommodate for the change in distance between the wheels 24A, 24B that occurs at the circumference of the wheels 24A, 24B, as discussed above. The solid link 231 may assist in ensuring the first wheel 24A and the second wheels 24B maintain rotational alignment with one another.

To assist in rotational alignment of the first wheel 22A with the second wheel 24B the wheels 24A, 24B may be gears and a portion 30 of the conduit 32 may have teeth to form a meshing relationship. Additionally, the wheels 24A, 24B may have beveled edges to increase the contact area between the wheels 24A, 24B and the conduit 32. In the embodiment shown the wheel axes 26A, 26B are perpendicular to one another.

The carrier 22A, 22B may be connected to the component 20 (shown in FIG. 1) such that the rotation of the carrier 22A, 22B relative to the conduit 32 may drive the component 20. Speed of rotation of the carrier 22A, 22B relative to the component 20 may optionally be modified by one or more gear sets (not shown). Moreover, the component 20 may include a drive shaft attached to the carrier 22A, 22B. As the shape memory alloy 18 drives the wheels 24A, 24B to rotate about the axes B the carrier 22A, 24B rotates the drive shaft and drives the component 20.

Figure 4:
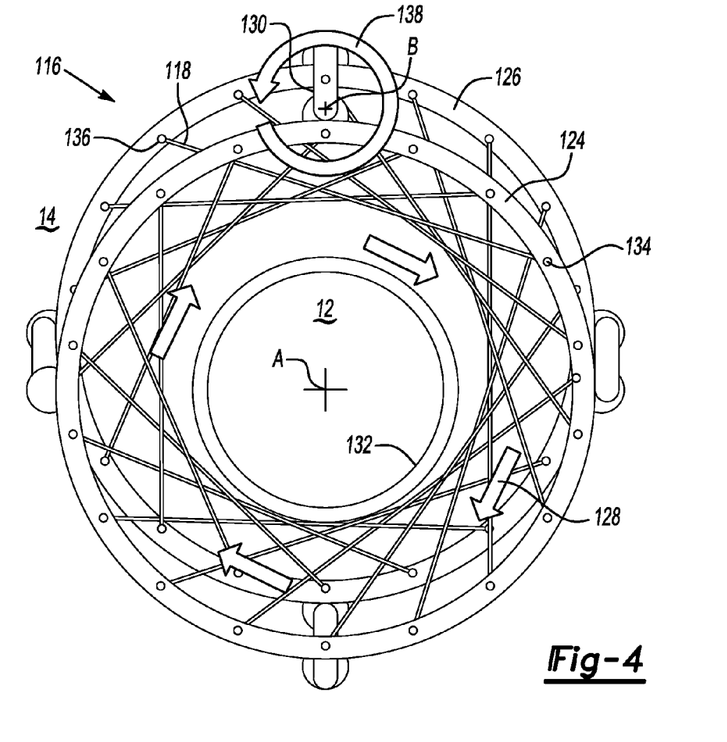
FIG. 4 is a schematic front view of a second embodiment of the energy harvesting system of FIG. 1.
Figure 5:
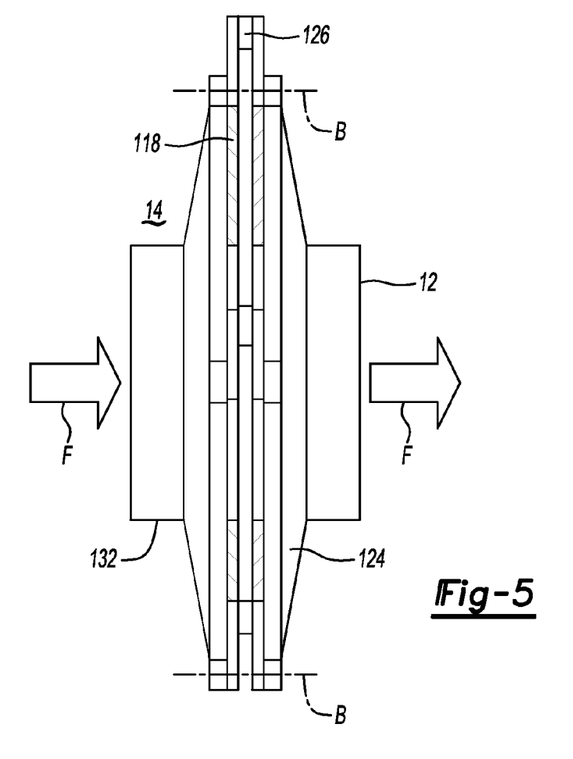
FIG. 5 is schematic side view of the second embodiment of the energy harvesting system of FIGS. 1 and 4.

FIGS. 4 and 5 illustrate a second embodiment of the heat engine 116. A first wheel 124 is generally located about and secured to a conduit 132. A second wheel 126 is also allocated around the conduit 132 and is supported by the first wheel 124 through a plurality of links 130 to provide an offset relation between the first wheel 124 and the second wheel 126. A plurality of discrete wires formed of shape memory alloy 118 each extend from a first attachment location 134 on the first wheel 124 to a second attachment location 136 on the second wheel 126.

The conduit 132 generally surrounds or is located within the first region 12. Fluid may flow through the conduit 132, as indicated by arrow F. Although the first region 12 may be mostly or entirely located within the conduit 132, the fluid may be a heat source or a heat sink such that the first region 12 extends outside the conduit 132 and the shape memory alloy 118 is in thermal contact or heat exchange relationship with the first region 12. The fluid within the energy harvesting system 142 forming the first region 12 and the second region 14 may be selected from a group of gases, liquids, and combinations thereof. The fluid may be for example exhaust gas for the vehicle 10, the first region 12 may be an exhaust pipe for the vehicle 10. The heat engine 116 is arranged about the exhaust pipe to take advantage of the temperature differential between the interior of the exhaust pipe and the exterior of the exhaust pipe.

As the shape memory alloy 118 is exposed to thermal contact or heat exchange relation with the first region 12 and the second region 14, the shape memory alloy 118 dimensionally expands and contracts. Additionally, the modulus of the shape memory alloy 118 changes as the shape memory alloy 118 is exposed to thermal contact or heat exchange relation with the first region 12 and the second region 14. In response to the dimensionally expanding and contracting shape memory alloy 118 and the accompanying changes in modulus, the first wheel 124 rotates in a first direction 128 about the first axis A. The links 130 are driven to rotate in a second rotational direction, indicated by arrow 138 about a plurality of second axes B. The second axes B is formed by the pivotable connection between the links 130 and the first wheel 124. Rotation of the links 130 about the second axes B results in the second wheel 126 oscillating about the conduit 132. The oscillation of the second wheel 126 results in the first wheel 124 rotating in the first direction 128.

That is, the temperature differential between the first region 12 and the second region 14 causes the shape memory alloy 118 to sufficiently dimensionally contract or expand. As a result, the discrete wire of the shape memory alloy 118 that is radially closest to the first axis A will have a shorter length than the shape memory alloy 118 that is radially further from the first axis A. The resulting movement results in rotation of the links 130 about the second axes B and oscillation of the second wheel 126 about the first axis A.

The sufficient dimensional contraction or expansion the shape memory alloy 118 causes the second wheel 126 to oscillate. The second wheel 126 may be connected to the component 20 (shown in FIG. 1) such that the oscillation of the second wheel 126 about the first axis A may drive the component 20. Speed of rotation of the second wheel 126 relative to the component 20 may optionally be modified by one or more gear sets (not shown). Moreover, the component 20 may include a drive shaft or outer wheel gear attached to the second wheel 126. As the shape memory alloy 118 drives the second wheel 126 to oscillate about the first axis A the second wheel 126 rotates the wheel gear and drives the component 20.

Figure 6:
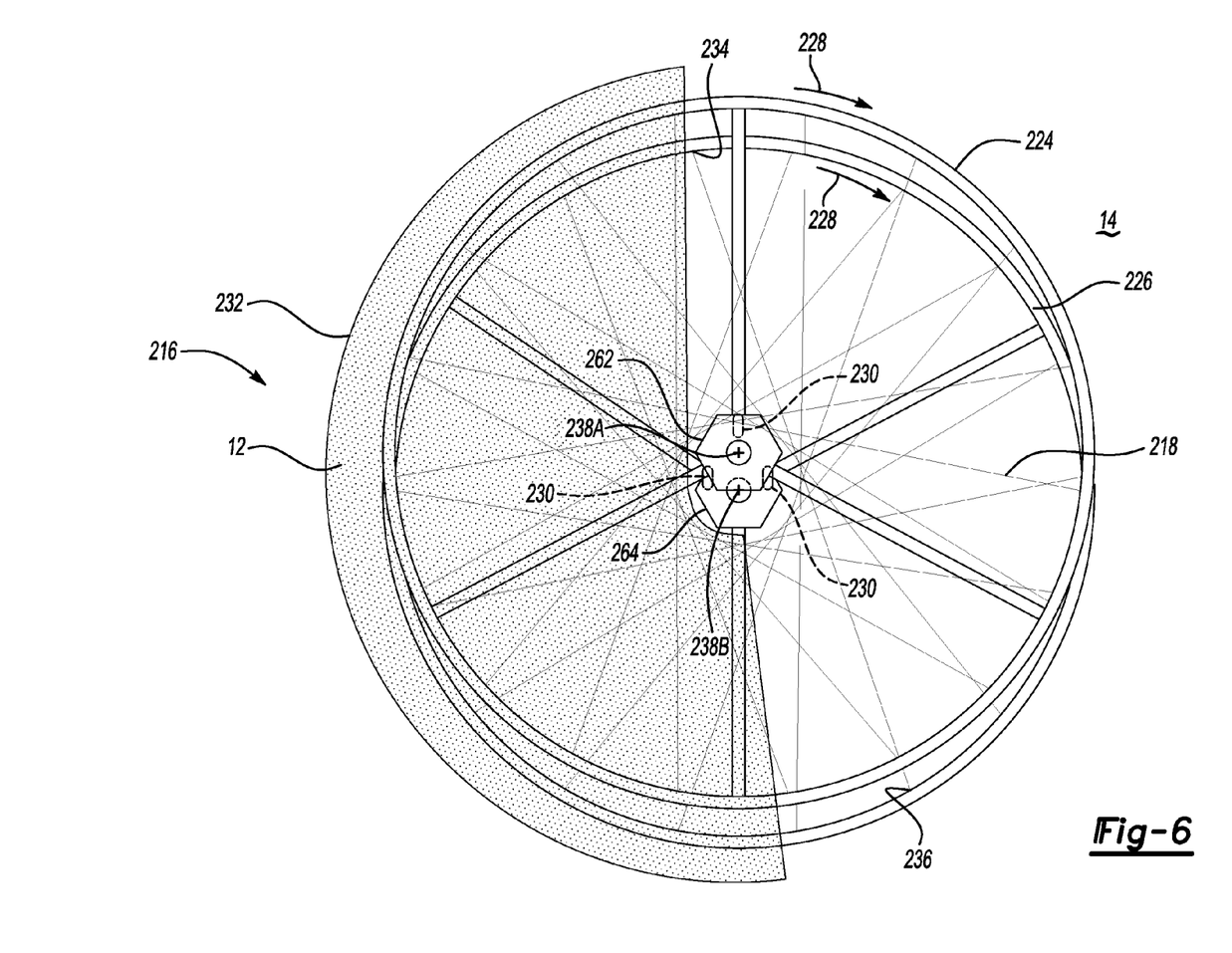
FIG. 6 is a schematic front view of a third embodiment of the energy harvesting system of FIG. 1.

FIG. 6 illustrates a third embodiment of a heat engine 216 for an energy harvesting system 242. A first wheel 224 is generally located about and secured to a first axle 262. A second wheel 226 is generally located about and secured to a second axle 264. A first plurality of links 230 provide an offset relation between the first axle 262 and the second axle 264. The first axle 262 rotates about a first axis 238A and the second axle 264 rotates about a second axis 238B. The first axis 238A and second axis 238B are parallel and both wheels 224 and 226 rotate in a first direction 228. A plurality of discrete wires formed of shape memory alloy 218 each extend from a first attachment location 234 on the first wheel 224 to a second attachment location 236 on the second wheel 226.

An object 232 may generally be located within the first region 12 (indicated by shaded region). The first region 12 is indicated by about half the area of the first wheel 224 and the second wheel 226 but may vary in shape from the object 232. The object may be a conduit and fluid may flow through the object 232. The first region 12 may extend to an area around the object 232, such that the shape memory alloy 218 is in thermal contact or heat exchange relationship with the first region 12. Fluid within the energy harvesting system 242 forming the first region 12 and the second region 14 may be selected from a group of gases, liquids, and combinations thereof. The fluid in the first region 12 may be exhaust, for example, and the object 232 may be an exhaust pipe for the vehicle 10. On the other hand, the object 232 may be a radiator hose and fluid in the first region 12 would be radiator fluid. The fluid in the second region 14 would therefore be air surrounding the exhaust pipe or radiator hose. The heat engine 16 is arranged about the exhaust pipe or radiator hose to take advantage of the temperature differential between the interior of the exhaust pipe or radiator hose and the exterior environment.

As the shape memory alloy 218 is exposed to thermal contact or heat exchange relation with the first region 12 and the second region 14, the shape memory alloy 218 dimensionally expands and contracts. Additionally, the modulus of the shape memory alloy 218 changes as the shape memory alloy 218 is exposed to thermal contact or heat exchange relation with the first region 12 and the second region 14. That is, the temperature differential between the first region 12 and the second region 14 causes the shape memory alloy 218 to sufficiently dimensionally contract or expand. As a result, the discrete elements (or portion thereof) of the shape memory alloy 218 that is radially within the first region 12 will have a shorter length than the shape memory alloy 218 that is in the second region 14 resulting in rotation of the first wheel 224 and the second wheel 226 in a first direction 128 about the first axis 238A and the second axis 238B.

In response to the dimensionally expanding and contracting shape memory alloy 218 and the accompanying changes in modulus, the first wheel 224 and the second wheel 226 are each driven to rotate about the first axis 238A and the second axis 238B respectively, which results the wires moving into and out of regions 12 and 14. Links 230 are pivotably connected to the first axle 262 and the second axle 262. The links 230 synchronize and secure the first axle 262 and the second axle 264 together while allowing the axles 262, 264 to rotate about the first axis 238A and the second axis 238B. Due to the offset relationship as the first axle 262 and the second axle 264 rotate the links 230 remain in a vertical orientation and orbit around the first axis 238A and the second axis 238B, as illustrated in FIG. 6.

While the first axle 262 and the second axle 264 rotate about the first axis 238A and the second axis 238B, the offset of the wheels 224, 226 and the connection pattern of the discrete lengths of the shape memory alloy 218 allow the variation in the length of the discrete elements which drives the rotation of the wheels 224, 226.

The first axle 262 and/or the second axle 264 may be connected to the component 20 (shown in FIG. 1) such that the rotation of the first axle 262 and/or the second axle 264 about the axes may drive the component 20. Alternatively, the first wheel 224 and/or the second wheel 226 may be connected to the component 20 such that the rotation of the first wheel 224 and/or the second wheel 226 about the second axis B may drive the component 20. Alternatively, the first wheel 224 or the second wheel 224 may be a component of a generator such as a rotor. Speed of rotation of the component 20 relative to the heat engine 216 may optionally be modified by one or more gear sets (not shown). Moreover, the component 20 may include a drive shaft or outer ring gear attached to the second first wheel 224 and/or the second wheel 226. As the shape memory alloy 218 drives the first wheel 224 and/or the second wheel 226 to rotate about the first axis 238A and/or the second axis 238B the first wheel 224 and/or the second wheel 226 rotates the ring gear and drives the component 20.

FIGS. 7-10, illustrates a fourth embodiment of the heat engine 316. A plurality of wires formed from a plurality of discrete elements of the shape memory alloy 318 each extends from a pin 324 to a respective wheel 326. The pin 324 extends from a shaft 322 which is rotatably supported on a frame 360. The shaft 322 may be rotatably supported on the frame 360 by a bearing 392, shown in FIG. 8.

Figure 7:
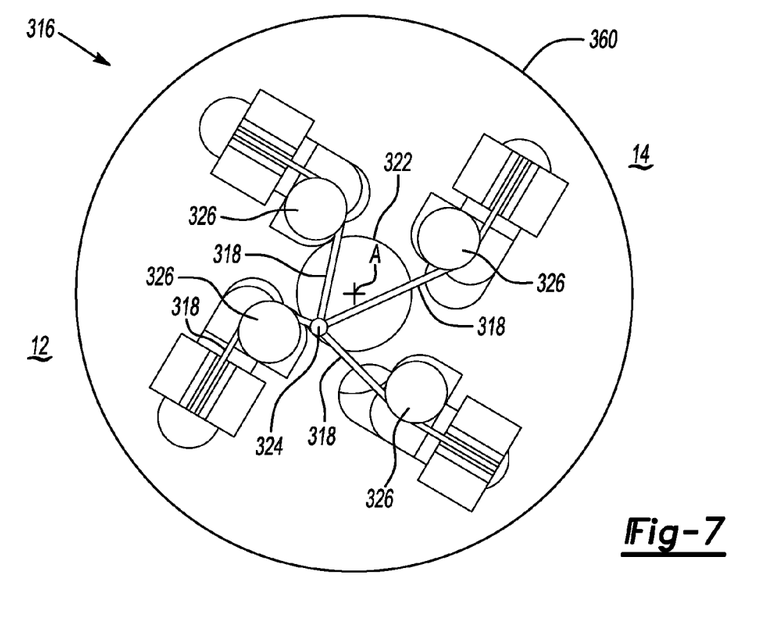
FIG. 7 is a schematic top view of a fourth embodiment of the energy harvesting system of FIG. 1.
Figure 8:
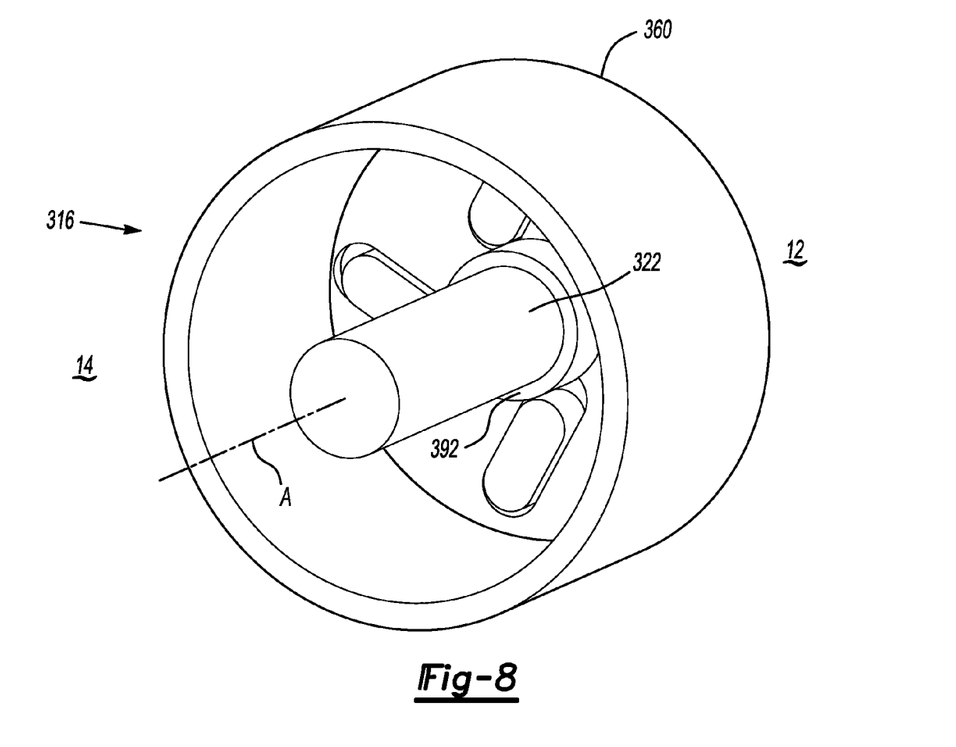
FIG. 8 is a schematic bottom perspective view of the fourth embodiment of the energy harvesting system of FIGS. 1 and 7.

The pin 324 is eccentrically located on the shaft 322 and the wheels 326 are generally concentrically arranged about the shaft 322 and a first axis A. Heat is sequentially applied to the discrete wires of the shape memory alloy 318 to alternately expose the plurality of discrete elements of the shape memory alloy 318 to first region 12 and the second region 14. The first region 12 covers approximately half of the frame 360 and the second region 14 covers approximately the other half. The first region 12 and the second region 14 rotate around the frame 360 such that the discrete elements of the shape memory alloy 318 are sequentially exposed to the first region 12 and the second region 14. In the embodiments shown, in FIG. 9 the first region 12 is centered on the lower left of the frame 360 and in FIG. 10 the fluid regions have rotated such that the first region 12 is now centered on the lower right side of the frame 360.

As the plurality of discrete elements of the shape memory alloy 318 are exposed to thermal contact or heat exchange relation with the first region 12 and the second region 14, the plurality of discrete elements of the shape memory alloy 318 dimensionally expand and contract. Additionally, the modulus of the shape memory alloy 318 changes as the shape memory alloy 318 is exposed to thermal contact or heat exchange relation with the first region 12 and the second region 14.

As each of the plurality of discrete elements of the shape memory alloy 318 contract the pin 324 is pulled toward the respective wheel 326 by the shape memory alloy 318. Likewise, as each of the plurality of discrete elements of the shape memory alloy 318 expand the pin 324 is allowed to move away, toward the next respective wheel 326. Movement of the pin 324 toward each of the respective wheels 326 in turn rotates the shaft 322 about the first axis A.

Figure 9:
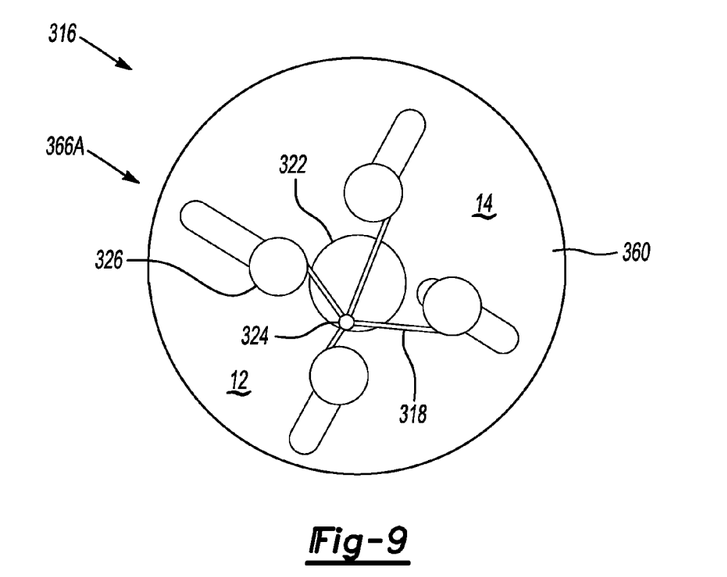
FIG. 9 is a schematic partial top view of the fourth embodiment of the energy harvesting system of FIGS. 1, 7 and 8 in a first position.
Figure 10:
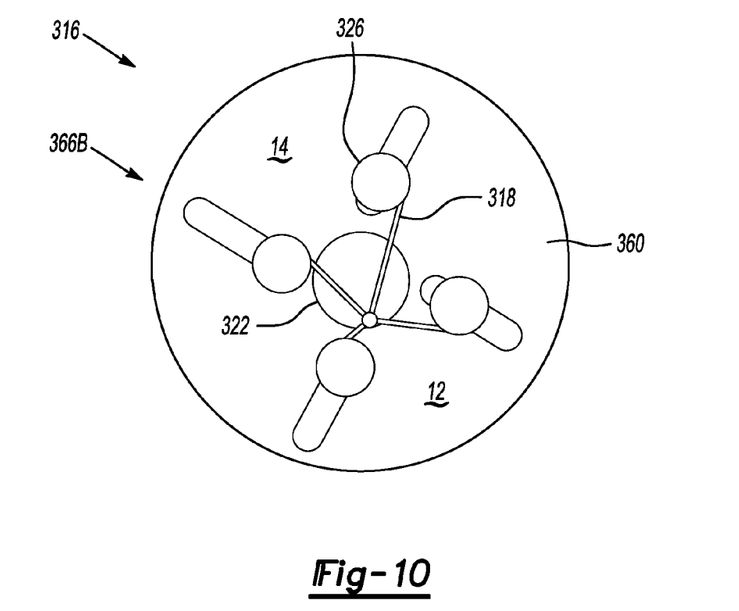
FIG. 10 is a schematic partial top view of the fourth embodiment of the energy harvesting system of FIGS. 1 and 7-9 in a second position.

FIG. 9 illustrates the heat engine 316 in a first rotational position 366A and FIG. 10 illustrates the heat engine 316 in a second rotational position 366B to illustrate the rotation of the pin 324 and the shaft 322. The temperature differential between the first region 12 and the second region 14 causes the shape memory alloy 18 to sufficiently dimensionally contract or expand in order to pull the pin 324 toward the respective wheel 326. Repeated heating and cooling of the plurality of discrete elements of the shape memory alloy 18 rotates the shaft 322 about the first axis A. Each discrete element of the shape memory alloy 318 may be wrapped around the wheels 326 to provide additional capacity dimensional change between the contraction and the expansion of the shape memory alloy 318.

Heat may be applied sequentially in a rotational manner about the first axis A to move the first region 12 and the second region 14 relative to the shape memory alloy 318. That is, rather than moving the shape memory alloy 318 into and out of the first region 12 and the second region 14, the first region 12 and the second region 14 may be moved instead to successively expose the discrete elements of the shape memory alloy 318 to thermal contact or heat exchange relations with the first region 12 and the second region 14.

The shaft 322 may be connected to the component 20 (shown in FIG. 1) such that the rotation of the shaft 322 may drive the component 20. Speed of rotation of the shaft 322 relative to the component 20 may optionally be modified by one or more gear sets (not shown). Moreover, the component 20 may include a drive shaft attached to the shaft 322 to drive the component 20.

Figure 11:
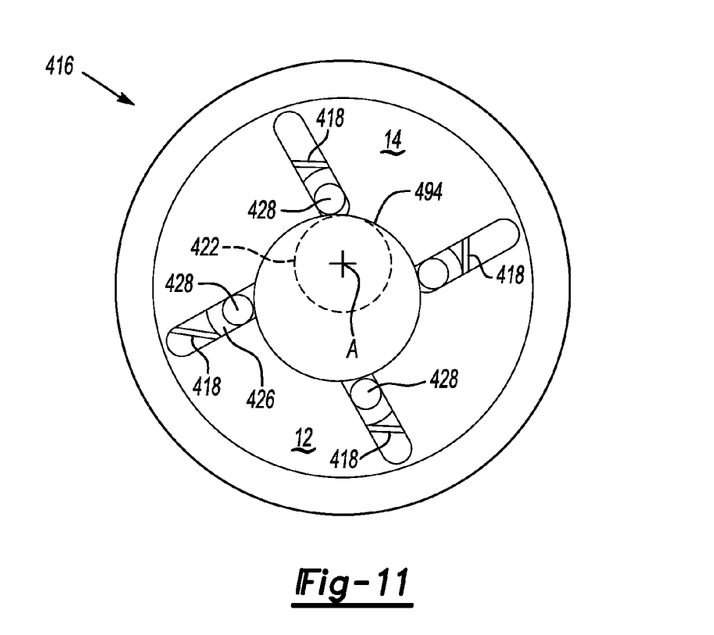
FIG. 11 is a schematic bottom view of a fifth embodiment of the energy harvesting system of FIG. 1.

FIG. 11 illustrates a fifth embodiment of the heat engine 416 the heat engine 416 has a similar configuration and operates in a similar manner as the heat engine 316 described above. However, as shown from the rear view heat engine 416 also includes a cam 494 located around the shaft 422. Each of the wheels 426 may have a downwardly extending portion 428. As the shaft 422 rotates the cam 494 rotates therewith. The cam 494 may apply force to the extending portions 428 of the wheels 426 to force the wheels 426 radially outward from the first axis A. The outward force may apply tensile force to the shape memory alloy 418 to assist in expanding the shape memory alloy 418 as it is exposed to the first region 12 to the second region 14.

While the best modes for carrying out the invention have been described in detail, those familiar with the art to which this invention relates will recognize various alternative designs and embodiments for practicing the invention within the scope of the appended claims.

The invention claimed is:

1. An energy harvesting system comprising:
  a first region having a first temperature;
  a second region having a second temperature that is different from said first temperature;
  a heat engine, configured for converting thermal energy to mechanical energy wherein the heat engine includes:
    a plurality of discrete elements of a shape memory alloy each having a crystallographic phase changeable between austenite and martensite in response to the temperature difference between the first region and the second region;
    at least one pair of wheels spaced apart from one another, wherein the plurality of discrete elements are secured at opposing ends to each of the at least one pair of wheels, and wherein the plurality of discrete elements are spaced about the circumference of the at least one pair of wheels;
    at least one member of the heat engine driven to rotate about a first axis by the crystallographic phase change of the plurality of discrete elements; and
  a component driven by the rotational output of the at least one member for the heat engine.

2. The energy harvesting system of claim 1, wherein the at least one pair of wheels is rotatably mounted to a carrier at an angle to the respective plurality of discrete elements such that the crystallographic phase of the discrete elements rotates the at least one pair of wheels around a pair of second axes that are perpendicular to one another.

3. The energy harvesting system of claim 2, wherein the at least one member is at least one of the at least one pair of wheels.

4. The energy harvesting system of claim 2, wherein the at least one member is the carrier, wherein the carrier is driven to rotate about the first axis by the rotation of the at least one pair of wheels.

5. An energy harvesting system comprising:
a first region having a first temperature;
a second region having a second temperature that is different from said first temperature;
a heat engine, configured for converting thermal energy to mechanical energy wherein the heat engine includes:
  a plurality of discrete elements of a shape memory alloy each having a crystallographic phase changeable between austenite and martensite in response to the temperature difference between the first region and the second region;
  a first wheel defining a first axis;
  a second wheel located proximate to the first wheel and located around the first axis;
  wherein the plurality of discrete elements each are attached to and extend from one location on the circumference of the first wheel to a second location on the circumference of the second wheel;
  a plurality of connecting links located about the circumference of the first wheel and the second wheel to connect the first wheel and the second wheel wherein the crystallographic phase change of the discrete elements rotates the plurality of links about a plurality of second axes to thereby oscillate the second wheel about the first wheel; and
  wherein the first wheel and the second wheel are driven to rotate about the first axis by the crystallographic phase change of the plurality of discrete elements; and
a component driven by the rotational output of the at least one member for the heat engine.

6. The energy harvesting system of claim 1, wherein the first region surrounds the first axis.

7. A vehicle comprising:
a first region having a first temperature, wherein the first region surrounds a conduit;
a second region having a second temperature that is different from the first temperature, wherein the second region at least partially surrounds the first region;
a heat engine configured for converting thermal energy to mechanical energy including:
  a first wheel and a second wheel located proximate to the first wheel;
  a plurality of discrete elements of a shape memory alloy each having a crystallographic phase changeable between austenite and martensite in response to a temperature difference between the first region and the second region;
  wherein the plurality of discrete elements each are attached to and extend from one location on the circumference of the first wheel to a second opposing location on the circumference of the second wheel; and
  wherein the first wheel and the second wheel are driven to rotate by the crystallographic phase change of the discrete elements;
  wherein the heat engine is driven to rotate about a first axis due to the rotation of the first wheel and the second wheel; and
a component of the vehicle driven by the rotation of one of the first wheel and the second wheel.

8. The vehicle of claim 7, wherein the heat engine further comprises:
a first axle defined by the first wheel;
a second axle defined by the second wheel;
wherein the first axle rotates about the first axis and the second axle rotates about a second axis which is parallel and offset from the first axis; and
wherein the first wheel and the second wheel are driven to rotate by the crystallographic phase change of the discrete elements to thereby drive the heat engine to rotate about the first axis.

9. The vehicle of claim 7, where the heat engine further comprises:
a plurality of connecting links located about the circumference of the first wheel and the second wheel to connect the first wheel and the second wheel wherein the crystallographic phase change of the discrete elements rotates the plurality of links about a plurality of second axes to thereby oscillate the second wheel about the first wheel; and
wherein the first wheel and the second wheel are driven to rotate about the first axis by the crystallographic phase change of the discrete elements.

* * * * *